Aug. 9, 1960 — E. K. WEISE — 2,948,799
ELECTRICAL CONTROL CIRCUITS UTILIZING THERMISTORS
Filed May 22, 1956 — 3 Sheets-Sheet 1

Inventor
Erwin K. Weise
by Hilmond O. Vogel
Attorney

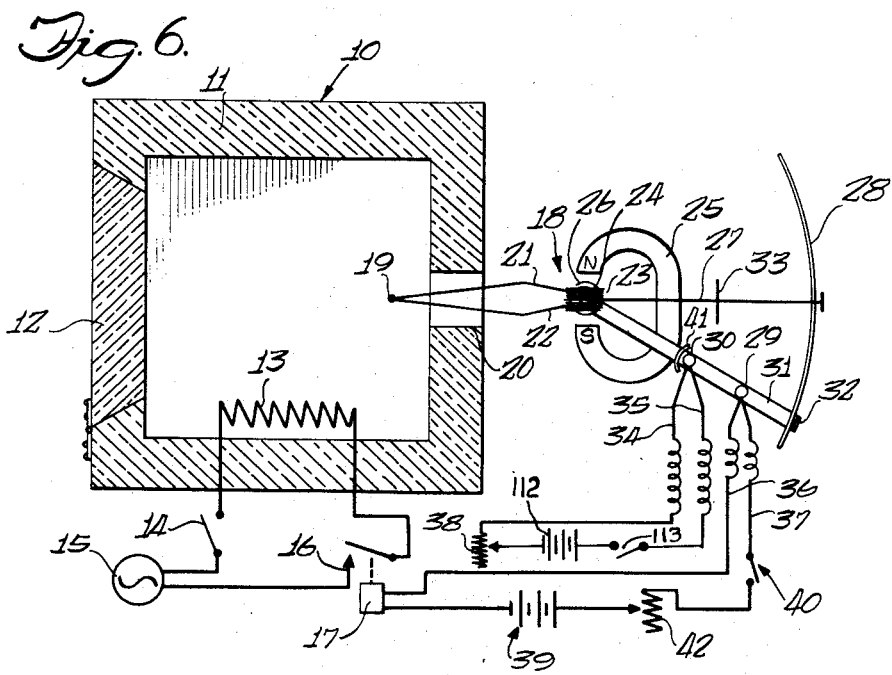
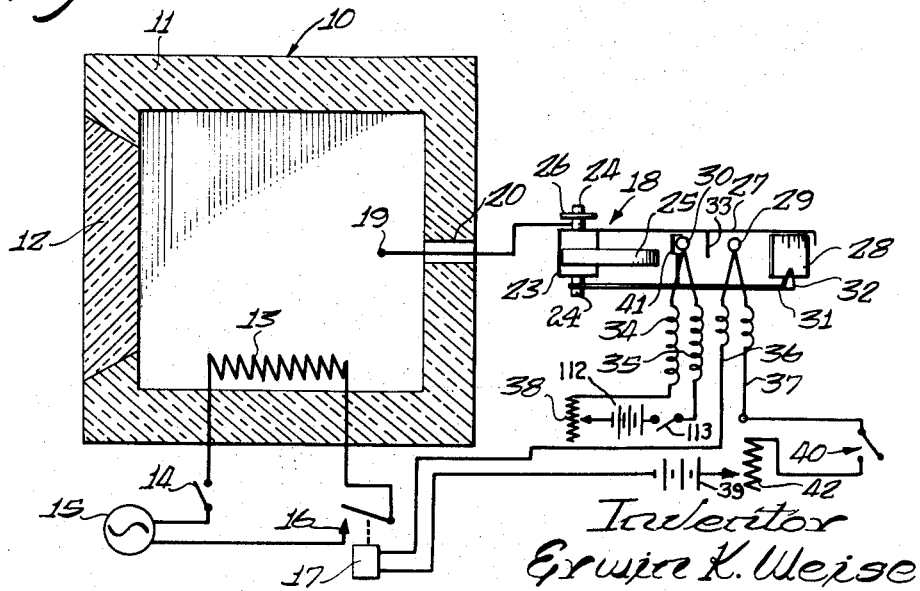

Aug. 9, 1960 E. K. WEISE 2,948,799
ELECTRICAL CONTROL CIRCUITS UTILIZING THERMISTORS
Filed May 22, 1956 3 Sheets-Sheet 3

Inventor
Erwin K. Weise
by Hilmond O Vogel
Attorney

United States Patent Office 2,948,799
Patented Aug. 9, 1960

2,948,799

ELECTRICAL CONTROL CIRCUITS UTILIZING THERMISTORS

Erwin K. Weise, Urbana, Ill., assignor to Semicon Inc., a corporation of Illinois Filed May 22, 1956, Ser. No. 586,621

15 Claims. (Cl. 219—20)

This invention relates generally to electrical control systems, and more specifically to improved electrical control systems utilizing thermistors wherein a mechanical motion input signal is transformed into an electrical output or control.

Many means are known in the art by which a mechanical motion is transformed into an electrical output or control. However, many of the means known in the art for accomplishing these purposes are cumbersome, expensive and inefficient. It is the object of the present invention to provide a simple and efficient electrical control system wherein thermistors are used within the system.

A feature of the present invention is the use of a mechanically actuated vane or shutter in combination with a thermistor and a source of directed radiant energy, wherein the movement of the vane or shutter is translated by the thermistor into an electrical output arrangement for controlling various devices.

Another feature of the present invention is the use of a thermistor control system as noted above in combination with an electrical furnace, and an electrical furnace temperature meter to control the temperature of the furnace.

Another feature of the present invention is the use of a thermistor control system as described above in combination with a fluid reservoir and fluid pump to control the amount of fluid in the reservoir.

Another feature of the present invention is the use of a thermistor control system as described above in combination with a gas heated fluid tank and a temperature meter to control the heating of the fluid tank.

Other objects and features of the present invention will be apparent upon a perusal of the following specification and drawings, of which:

Figure 6 is a top cross sectional view partially in schematic of another embodiment of the present invention as applied to an electrical furnace;

Figure 7 is a side cross sectional view partially in schematic of the structure shown in Figure 6;

The present embodiments are the preferred embodiments, but it is to be understood that changes can be made in the present embodiments by one skilled in the art without departing from the spirit and scope of the present invention.

Figure 1:
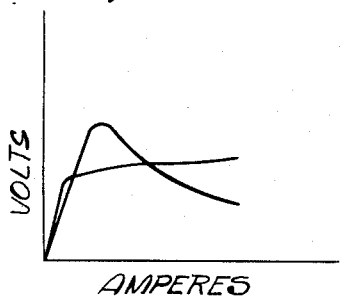
Figure 1 is a chart showing the voltage-current characteristics of thermistors suitable for the present invention.

The thermistor, as is known in the art, is an electric resistor having a high temperature coefficient of resistance. A suitable thermistor must have a relatively small mass so that it will have a very small thermal inertia. The thermistor may be of any suitable shape such as a bead, a cylinder, a wire, rod or flake. Suitable thermistors may have the voltage-current characteristics as shown in Figure 1, that of a negative temperature coefficient of resistance wherein in one curve, as the current increases, the voltage has a range of a constant value, and in the other curve, as the current increases, the voltage has a range of decreasing values. Although not shown in the present embodiment various positive thermistors may be used.

Generally, in the present invention the thermistor is mounted in cooperation with a source of directed radiant energy, and a movable vane or shutter. The vane or shutter is connected to some means which mechanically activates or moves the shutter responsive to some condition or signal. The rays of radiant energy are directed onto the thermistor and the vane or shutter cooperates with the source of radiant energy and the thermistor so as to control the amount of radiant energy directed from the source of radiant energy to the thermistor. The thermistor is connected into certain circuits for either directly or indirectly controlling the means imparting mechanical motion to the shutter or vane, or some device related to that means. This is partially schematically shown in Figure 2 wherein a rod type thermistor 3 is mounted some distance from a source of radiant energy 5. The radiant energy is directed to the thermistor 3 in a concentrated beam through the lens 6 which is mounted between the source of radiant energy 5 and the thermistor 3 at a position wherein the radiant energy from the source of radiant energy 5 is focused onto the thermistor 3. The shutter or vane 7 is positioned so as to be movable between the lens 6 and the thermistor 3 substantially at the focal plane of the lens 6. This placement of the vane 7 permits a maximum amount of radiant energy to be controlled by the vane 7 with a minimum movement of the vane 7.

Figure 3:
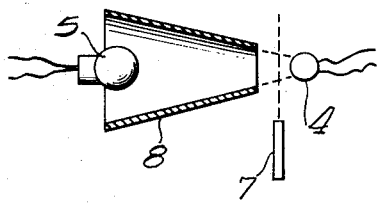
Figures 3 and 4 are other embodiments of the structure shown in Figure 2.
Figure 2:
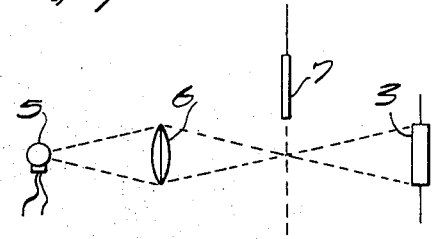
Figure 2 is a diagrammatic view of the basic elements of the present invention.

Figure 3 partially schematically shows another embodiment of the structure shown in Figure 2. Herein a bead type thermistor 4 is mounted in a spaced apart relationship to the source of radiant energy 5 and the vane 7 is positioned for movement between the source of radiant energy 5 and the thermistor 4 to prevent any radiant energy from the source of radiant energy 5 from heating the thermistor 4 when the vane 7 is disposed substantially therebetween. In this embodiment the rays of radiant energy are focused by a conical mirror 8 to concentrate the rays of radiant energy from the source of radiant energy 5 directly upon the thermistor 4.

Figure 4:
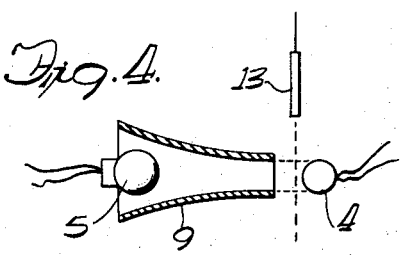

The embodiment shown in Figure 4 is similar to that of Figure 3, except that the conical mirror is formed as a conical mirror 9 with curved walls to more efficiently cover the thermistor 4 with rays of radiant energy from the source of radiant energy 5.

Figure 5:
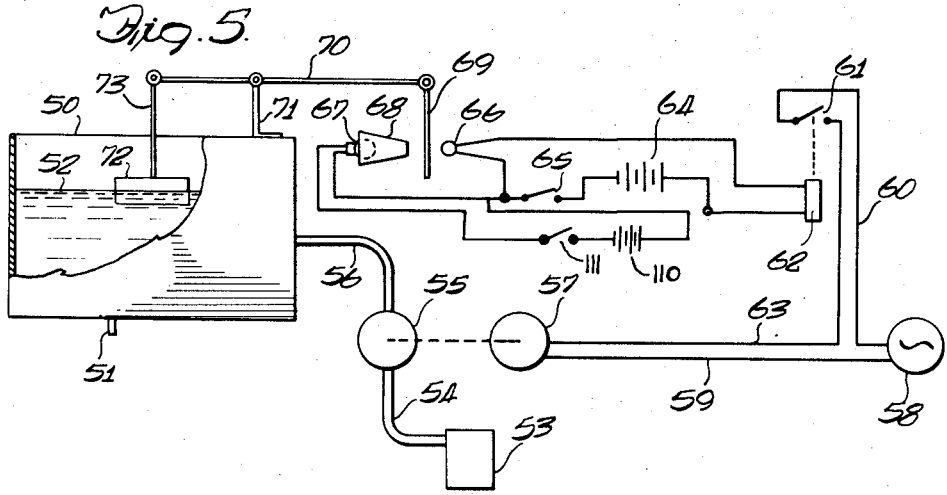
Figure 5 is a diagrammatic view of one embodiment of the present invention as applied to controlling a fluid reservoir.

For a detailed description of the present invention as applied to a fluid reservoir and fluid pump, reference is made to Figure 5. A fluid reservoir 50 is provided having an outlet tube 51 from which the fluid 52, contained in the reservoir 50, may flow. To supply fluid to the reservoir 50, a source of fluid 53 is provided. The source of fluid 53 is connected by suitable tubing 54 to the inlet of a fluid pump 55. The outlet of the fluid pump 55 is connected to the reservoir 50 through suitable tubing 56. The fluid pump 55 may be of any type well known in the art, and is operated by a suitable electric motor 57 coupled thereto. A source of power 58 for the electric motor 57 is also provided. One side of the power source 58 is connected by conductor 59 to the electric motor 57. The other side of the source of power 58 is connected through conductor 60 to one contact of the pair of contacts 61 of the relay 62. The pair of contacts 61 of the relay 62 are arranged to be closed responsive to the energization of the relay 62, and opened responsive to the deenergization of the relay 62. The other contact of the pair of contacts 61 of the relay 62 is connected by a conductor 63 to the electric motor 57. Thus it may be seen that when relay 62 is energized, contacts 61 will be closed to complete an obvious circuit for the operation of the electric motor 57. The electric motor 57 in operating will operate the fluid pump 55 to cause fluid to be delivered to the reservoir 50.

The coil of the relay 62 is connected in series with a battery 64, a switch 65 and a bead type thermistor 66. When the switch 65 is closed an obvious circuit for the energization of relay 62 is completed. However, thermistor 66, battery 64 and relay 62 are so selected that when thermistor 66 is at the ambient temperature, the resistance thereof is high enough to prevent a sufficient amount of current to flow through the relay 62 to energize relay 62. To raise the temperature of thermistor 66 so as to drop the voltage thereacross and increase the current therethrough to a degree permitting the energization of relay 62 sufficient to close contact 61, a source of radiant energy 67 is provided. The source of radiant energy 67 is connected in series with a battery 110 and a switch 111. The source of radiant energy 67 is positioned in a spaced apart relationship to the thermistor 66 and the rays of radiant energy from the source of radiant energy 67 are directed or focused onto the thermistor 66 by an arrangement similar to that described for Figure 3. A conical mirror 68 is positioned so as to efficiently direct the rays of radiant energy from the source of radiant energy 67 to the thermistor 66. The thermistor 66 may be mounted in the air or in an envelope containing a neutral gas such as helium. The envelope protects the thermistor from undesired cooling by convection air currents. However, the envelope must be such as will permit the rays of radiant energy to pass therethrough to strike the thermistor 66. The amount of radiant energy from the source of radiant energy 67 which will strike the thermistor 66 is controlled by the vane 69. The vane 69 is pivotally mounted at one end of a lever 70. The lever 70 is pivotally mounted intermediate its ends to a standard 71 mounted on the reservoir 50. A float 72, carried by the fluid 52 within the reservoir 50, is pivotally connected to the other end of the lever 70 through an arm 73. The vane 69 is positioned so as to be moved within a plane between the source of radiant energy 67 and the thermistor 66 as the fluid level within the reservoir 50 is raised and lowered. As can be seen in Figure 5, the float 72 is shown at a position wherein the vane 69 is projected directly between the source of radiant energy 67 and the thermistor 66 cutting off any radiation from the source of radiant energy 67 to the thermistor 66. As the fluid level within the reservoir 50 drops, due to fluid flowing therefrom through the outlet tube 51, the float 72 will be lowered. This will cause the vane 69 to be raised, and when the vane 69 is raised sufficiently, the rays of radiant energy from the source of radiant energy 67 will strike the thermistor 66 to heat the thermistor 66 raising its temperature. As the temperature of the thermistor 66 is raised, the resistance thereof will drop and sufficient current will flow through the relay 62 to cause a closing of contacts 61. The electric motor 57 will then operate to operate the fluid pump 55 to deliver more fluid to the reservoir 50. As fluid 52 is delivered to the reservoir 50, the fluid level will rise carrying with it the float 72. As the float 72 is raised, the vane 69 will be lowered, and when the vane 69 has been lowered sufficiently to break the beam of radiation from the source of radiant energy 67 to the thermistor 66, the thermistor 66 will begin to cool. As the thermistor 66 cools, the resistance thereof will rise sufficiently to substantially reduce the current passing through the relay 62, and the relay 62 will be sufficiently deenergized to permit the contacts 61 to open. As the contacts 61 open, the electric motor 57 will cease operating and the pump 55 will no longer deliver fluid 52 to the reservoir 50. This cycling of the system will be repeated as often as necessary to maintain the level of the fluid 52 within the reservoir 50 at a predetermined level.

Turning next to a detailed description of another embodiment of the present invention as applied to a temperature meter and an electric furnace for controlling the temperature of the electric furnace, reference is made to Figures 6 and 7. The electric furnace to be controlled is shown in a top cross sectional view in Figure 6 and in a side cross sectional view in Figure 7. The electric furnace 10 which may be of any type well known in the art, generally comprises a rectangular box-like structure having relatively thick walls including fire brick 11. The front portion of the furnace 10 is provided with a door 12 so that any material to be heated may be inserted therethrough into the interior of the furnace 10. The interior of the furnace 10 is heated by a heating element 13 which is shown schematically in the drawing. One side of the heating element 13 is connected to a manual switch 14 which, in turn, is connected to one side of a source of power 15. The other side of the power source 15 is connected to one contact of relay contacts 16 of relay 17. The other side of the heating element 13 is connected to the other contact of relay contacts 16. The relay contacts 16 are so selected, relative to the relay 17, that when relay 17 is energized, contacts 16 are closed. Thus it can be seen that when the manual switch 14 is closed, and when relay 17 is energized, the power source 15 is connected to the heating element 13 to energize the heating element 13 to heat the furnace 10.

To indicate the temperature within the electric furnace at any instant, an electric furnace meter 18 is provided. The meter 18 which may be of any suitable type known in the art is shown schematically in the drawings. The meter 18 comprises a thermocouple 19 which is mounted through an opening 20 in one wall of the furnace 10. The thermocouple 19 will generate a current through the conductors 21 and 22 dependent upon the temperature within the electric furnace 10. The conductors 21 and 22 are connected to a meter coil 23. The meter coil 23 is pivotally mounted through pins 24. A permanent magnet 25 is mounted in cooperation with the meter coil 23 so that any current flowing through the meter coil 23, generated by the thermocouple 19, will cause a deflection of the meter coil 23 about its pivot pins 24 between the poles of the permanent magnet 25. A coil spring 26, which is connected between the case (not shown) for the meter 18 and the upper pin 24 biases the meter coil 23 to a zero reference point, and any deflection of the meter coil 23 is against the bias of the coil spring 26. To visually indicate the temperature within the electric furnace 10 at any instant, a pointer 27 and a calibrated scale 28 are provided. The pointer 27 is fixed at one end thereof to the upper pivot pin 24 and extends radially therefrom. The scale 28 is calibrated to indicate the temperature within the electric furnace 10 and is curved with substantially the same curvature as that of the curve traced by the outer end of the pointer 27. The pointer 27 and the calibrated scale 28 are relatively positioned so that as the meter coil 23 is deflected by any current generated by the thermocouple 19, the pointer 27 will sweep the calibrated scale 28 to indicate at any instant the temperature within the electric furnace 10. In the instant embodiment the scale 28 is so calibrated that the indicated temperatures rise from a minimum to a maximum in a clockwise movement of the pointer 27, as viewed in Figure 6.

To control the maximum temperature which the electric furnace 10 may reach at any time, a bead type thermistor 29 and a source of directed radiant energy 30 are provided. Due to the negative coefficient of resistance of the thermistor 29, its resistance will be relatively low when the thermistor has been heated by some source of radiant energy, and its resistance will be relatively high when the thermistor is relatively cool or at normal ambient temperatures. The source of radiant energy 30 may be of any type well known in the art such as an incandescent lamp or a length of heated resistance wire. The thermistor 29 and the source of radiant energy 30 are both mounted, in a spaced apart relationship to each other, on an arm 31, which is freely pivotally mounted about the lower pivot pin 24. In the instant embodiment of the invention, the radiant energy from the source of radiant energy 30 is directed to the thermistor 29 by a curved mirror 41 which is mounted on the arm 31 so as to direct the radiant energy toward the thermistor 29. The arm 31 extends without the casing (not shown) of the electric meter 18 so that the arm 31 may be pivoted to any radial position between the extremes of the calibrated scale 28. The outer end of the arm 31 carries an indicating tab 32 so that the arm 31 may be selectively aligned at any temperature reading on the calibrated scale 28. The thermistor 29 and the source of radiant energy 30, which are in the noted radial alignment on the arm 31, are also positioned substantially adjacent to the plane within which the pointer 27 moves. The pointer 27 is provided with an opaque vane 33 which is positioned intermediate the ends thereof to depend therefrom. The opaque vane 33 is formed of any suitable material, such as a metal foil, which will prevent any rays of radiant energy from passing therethrough. The opaque vane 33 is further positioned on the pointer 27 so that when the pointer 27 indicates a temperature on the calibrated scale 28 substantially equal to the temperature to which the tab 32 and the arm 31 are indexed, the vane 33 will be interposed between the source of radiant energy 30 and the thermistor 29 to prevent any radiant energy emanating from the source of radiant energy, and directed by the mirror 41, from striking the thermistor 29.

Conductors 34 and 35 are connected to the source of radiant energy 30, and conductors 36 and 37 are connected to the thermistor 29. These conductors 34, 35, 36 and 37 have sufficient slack, as shown by the coils, so that the arm 31 may be pivoted as described above. The other end of conductor 34 is connected to one side of a rheostat 38, and the other side of the rheostat 38 is connected to one side of a power source 112. The conductor 35 is connected to one side of a single-pole single-throw switch 113 and the other side of the switch 113 is connected to the other side of the power source 112. Although the power source 112 is shown as a battery, it is not intended that this invention be limited thereto since any other suitable type of power source may be used dependent upon the particular characteristics of the source of radiant energy 30. The following circuit is provided for the relay 17 and the thermistor 29: power source 39, the relay coil of relay 17, conductor 36, thermistor 29, conductor 37, switch 40, and rheostat 42 to the other side of the power source 39. This described series circuit for the relay 17 and the thermistor 29 is completed when the switch 40 is closed. Closing of switch 113 completes the described circuit for energization of the source of radiant energy 30. The rheostat 38 may be adjusted to control the emission level of the source of radiant energy 30. The rheostat 42 is adjusted to properly match the battery 39, relay 17, and thermistor 29. An amplification effect may be achieved if the rheostat 42 is adjusted so that the operating point for the relay 17 is situated on that portion of the voltage-current curve of the thermistor 29 wherein the resistance of the thermistor 29 is negative or the voltage across the thermistor is rapidly decreasing as the current therethrough increases, as shown by one of the curves in Figure 1. In order to stabilize the operating point for relay 17, the total series resistance in the described circuit for relay 17 and thermistor 29 must have such a value that its voltage-current characteristic on a graph such as Figure 1 intersects from above with the voltage-current characteristic of the thermistor 29. The rheostat 42 may be eliminated by providing the relay 17 with sufficient resistance in its winding, as may be done by winding the relay coil of a high resistance nickel-chromium wire. When the various components in the above described circuits are properly selected and matched, the source of radiant energy, when energized, will directly heat the thermistor 29 to a degree wherein the resistance of the thermistor 29 will drop to a value low enough to permit sufficient current to flow through the described series circuit of the relay coil 17 and the thermistor 29 so that the relay 17 will be operated to close contacts 16. Further, when the vane 33 is disposed between the source of radiant energy 30 and the thermistor 29, the resistance of the thermistor will rise to a degree wherein insufficient current will flow through the described series circuit for the relay coil 17 to maintain the relay 17 operated, so that the relay 17 will release opening its contacts 16.

Turning next to a description of the operation of the instant embodiment shown in Figures 6 and 7, and assuming that the switches 14, 113 and 40 are closed, and that the arm 31 is moved to a certain position wherein the indexing tab 32 on the arm 31 indicates the desired maximum temperature of the electric furnace 10, the source of radiant energy 30 will then be energized through the previously described circuit and will begin to heat the thermistor 29. As the thermistor 29 is heated, its resistance will drop and when a certain relatively low value is reached, the relay 17 will operate through the previously described circuit therefor to close contacts 16. When contacts 16 are closed, the previously described circuit for the heating element 13 will be completed and heating element 13 will begin to heat the interior of the electric furnace 10. As the temperature within the electric furnace 10 rises, a current will be generated by the thermocouple 19, and the meter coil 23 connected thereto will begin to deflect causing the pointer 27 to advance upward on the calibrated scale 28 to indicate at any instant the temperature within the electric furnace 10. When the pointer 27 reaches the temperature setting of the tab 32, the vane 33 will be moved between the source of radiant energy 30 and the thermistor 29. The thermistor 29 will then cool, and in cooling its resistance will rise. When the resistance of the thermistor reaches a predetermined value, the relay 17 will release, opening contacts 16. With the opening of contacts 16, the circuit for the heating element 13 will be opened, and the temperature within the electric furnace 10 will not be caused to rise any further. As heat losses from the electric furnace 10 cause the temperature therein to be reduced, the reduced temperature will effect the thermocouple 19 to cause the pointer 27 to move downward on the calibrated scale 28. When the pointer 27 moves downward on the calibrated scale 28 sufficiently to remove the vane 33 from its previously described position between the source of radiant energy 30 and the thermistor 29, the source of radiant energy 30 will again heat the thermistor 29, and as previously described, when the resistance of the thermistor 29 reaches the previously noted predetermined low value, the relay 17 will again operate to close contacts 16 to again energize the heating element 13. Therefore, it can be seen that by the previously described means, the temperature of the electric furnace 10 may be maintained at any selected value and that at no time will the temperature within the electric furnace 10 be permitted to rise any substantial amount above that selected value.

Figure 8:
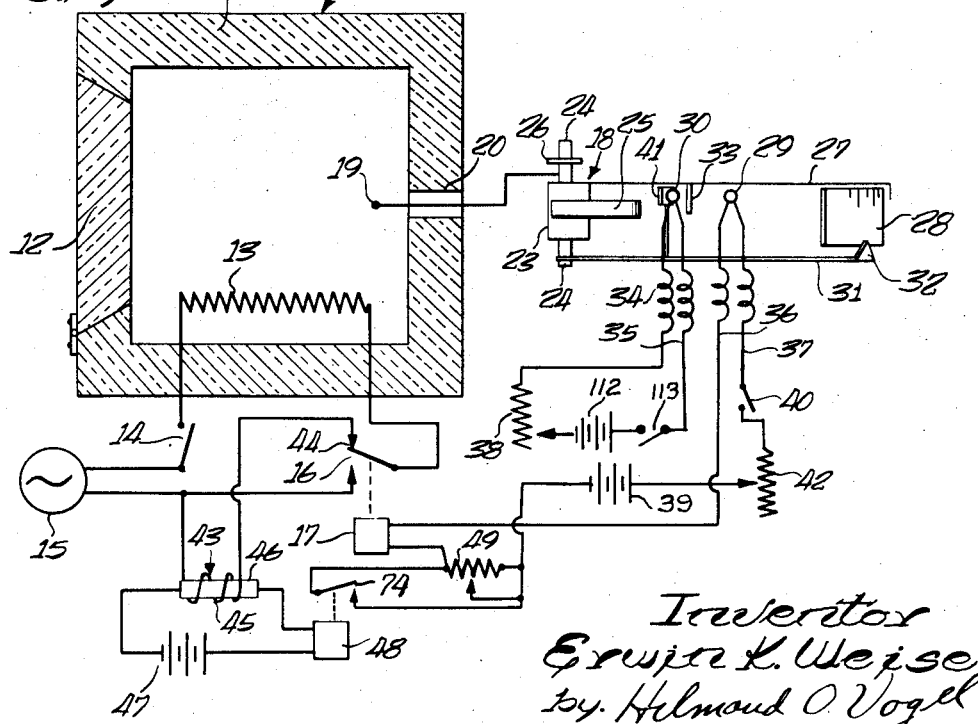
Figure 8 is another embodiment of the structure shown in Figure 7.

Turning next to a description of the structure shown in Figure 8, reference is made thereto. Figure 8 discloses a modification of the embodiment of the present invention shown in Figures 6 and 7. The structure shown in Figure 8 includes an anticipator element 43 with additional means for effecting its operation. The function of the anticipator element 34 is to provide a smoothing out action in the operation of the various elements to compensate for the inherent inertias of the elements and to decrease temperature fluctuations in the electric furnace due to those inherent inertias. The various elements in Figure 8 which have substantially the same function as similar elements in Figures 6 and 7 are designated by the same numerals. As shown in Figure 8, the relay 17 is provided with an additional set of contacts 44. The contacts 44 are so arranged as to be closed when the relay 17 is deenergized, and the contacts 44 include the previously noted contact of contacts 16 which was connected to one side of the furnace heating element 13. The other contact of the pair of contacts 44 is connected to a heating coil 45 of the anticipator element 43. The other side of the heating coil 45 is connected to the contact of the pair of contacts 16 which was directly connected to the source of power 15. Thus it may be seen that when relay 17 is deenergized, and switch 14 is closed, the following circuit is completed: from one side of the source of power 15, switch 14, furnace heating element 13, contacts 44, heating coil 45, to the other side of the source of power 15. The heating coil 45 is wound about a rod type thermistor 46 of the anticipator element 43. The thermistor 46 is connected in series with a battery 47 and the relay coil of relay 48. It can thus be seen that with the thermistor 46, battery 47, and the relay coil of relay 48 properly matched, the thermistor 46, when relatively cool, will offer a sufficiently high resistance in the circuit to prevent the energization of relay 48, and when heated by the heating coil 45 to a certain degree, will offer a relatively low resistance to the circuit and permit the energization and operation of relay 48 to close its contacts 74. The circuit for the energization of relay 17 is changed by the addition of the potentiometer 49. The resistance of the potentiometer 49 is connected in series with the relay coil of relay 17 and battery 39 to provide the following circuit for the energization of relay 17: from one side of relay 17, conductor 36, thermistor 29, conductor 37, switch 40, rheostat 42, battery 39, resistance of potentiometer 49, to the other side of relay 17. The relay contacts 74 of relay 48 are connected in shunt of the entire resistance of the potentiometer 49, and the movable arm of potentiometer 49 is connected in shunt of a variable portion of the resistance of the potentiometer 49. Thus it can be seen that when the relay contacts 74 are closed, the entire resistance of the potentiometer 49 is shunted, and when the relay contacts 74 are open, a portion of the resistance of the potentiometer 49 will be shunted dependent upon the position of the movable arm of the potentiometer 49.

Next describing the operation of the embodiment shown in Figure 8, reference is again made thereto. Assuming that switches 40, 113 and 14 are closed and that the vane 33 is not interposed between the source of radiant energy 30 and the thermistor 29, but with the pointer 27 indicating a relatively cool temperature of the furnace 10. The thermistor 29 will then be heated by the source of radiant energy 30 to a degree wherein the resistance of the thermistor 29 is relatively low, considering the other resistances in the circuit and especially that portion of the resistance of the potentiometer 49 not shunted by the movable arm thereof. The relay 17 will then operate to close contacts 16. The furnace heating element 13 will then be energized over the previously described circuit to cause the furnace 10 to be heated. As the temperature of the furnace 10 rises, the thermocouple 19 will cause the pointer 27 of the meter 18 to advance upwardly on the scale 28. When the pointer 27 is moved to the temperature on the scale 28 to which the tab 32 of the arm 31 has been indexed, the vane 33 will be interposed between the source of radiant energy 30 and the thermistor 29. The thermistor 29 will cool, and the resistance thereof will rise. When a certain predetermined value of the resistance of the thermistor 29 is reached, the relay 17 will release, opening its contacts 16 and closing its contacts 44. The furnace heating element 13 will be deenergized, and the heating coil 45 will be energized. As the heating element 45 heats the thermistor 46 of the anticipator element 43, the resistance of the thermistor 46 will drop and when a certain predetermined value of resistance of the thermistor 46 is reached, dependent upon the matching of the thermistor 46, the battery 47, and the relay coil of relay 48, the relay 48 will be energized to close its contacts 74. When relay contacts 74 are closed, the resistance of potentiometer 49 will be completely shunted reducing the series resistance in the circuit for the energization of relay 17. This reduction in the series resistance in the circuit for energizing relay 17 is in addition to the reduction in resistance produced by the heating of the thermistor 29 by the source of radiant energy 30 as the vane 33 moves out of the path of radiant energy from the source of radiant energy 30 to thermistor 29. The vane 33 is moved out of that path by the pointer 27 moving downward on the scale 28 as the furnace 10 cools due to heat losses. This added reduction in the series resistance will shorten the time, relative to the time required in the embodiment shown in Figures 6 and 7, in which relay 17 will again be energized sufficiently to operate and close contacts 16. When relay 17 operates, contacts 44 will be opened and contacts 16 will be closed. The closing of contacts 16 again energizes the furnace heating element 13 to heat the furnace 10. The opening of contacts 44 breaks the circuit for the energization of heating coil 45 of the anticipator element 43. As the temperature of the furnace rises, the vane 33 will again be moved toward the position between the source of radiant energy 30 and the thermistor 29. While this operation is taking place, the thermistor 46 of anticipator element 43 will cool and its resistance will rise sufficiently to cause relay 48 to release opening contacts 74. When contacts 74 open, a portion of the resistance of the potentiometer 49 will again be inserted in the series circuit for the energization of relay 17. This inserted resistance in the series circuit for relay 17 will be added to the increased resistance provided in the circuit when the vane 33 is interposed between the source of radiant energy 30 and the thermistor 29 permitting the thermistor 29 to cool and its resistance to rise. This in effect will cause the relay 17 to release in a shorter period of time than the period of time necessary in the embodiment shown in Figures 6 and 7 as the thermistor therein is cooled. Thus it may be seen that the effect of the anticipator element 43 and its associated circuitry is to cause the relay 17 to operate and release sooner than it would in the arrangement shown in Figures 6 and 7, thereby reducing the inertias of the elements. This will result in a more accurate maintenance of the temperature of the electric furnace at the selected temperature. This arrangement, of course, requires that the thermal inertia of the anticipator element 43 be substantially smaller than the thermal inertia of the furnace heating element 13. However, in practice such a condition would normally prevail since normally the mass of the furnace heating element 13 would be considerably larger than the mass of the anticipator element 43. To accurately adjust and reduce the fluctuations in temperature of the arrangement shown in Figure 8, it is merely necessary to adjust the movable arm of the potentiometer 49 to a point whereat the temperature fluctuations of the electric furnace 10 are at a minimum. In practice, by a proper adjustment of potentiometer 49, any fluctuations in temperature of the electric furnace 13 can be made to virtually disappear.

Figure 9:
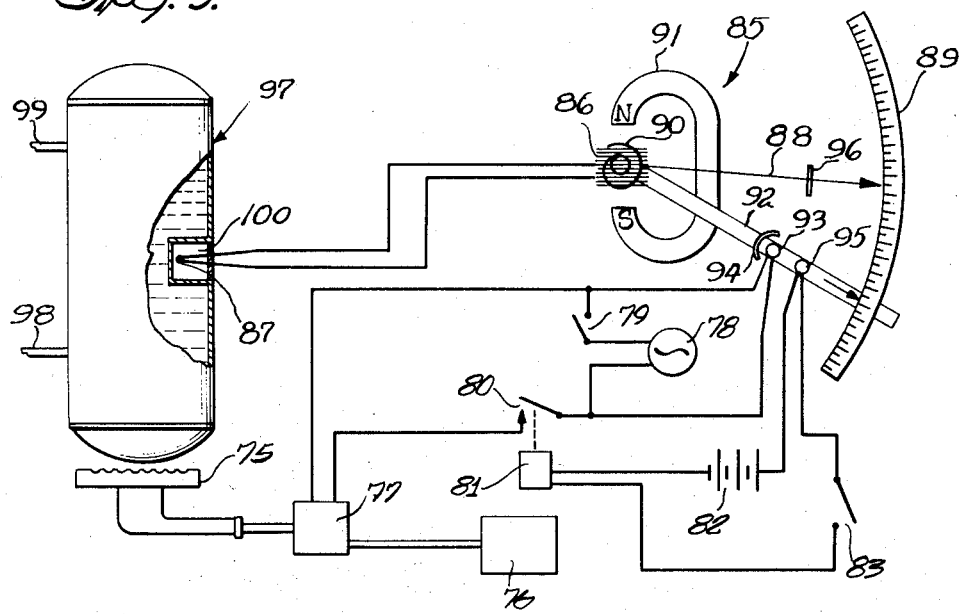
Figure 9 is a diagrammatic view of another embodiment of the present invention as applied to a heated fluid tank.

Turning next to the embodiment of the present invention shown in Figure 9, that wherein the thermistor control system is applied to controlling the temperature of a heated fluid tank, reference is made thereto. In this embodiment a temperature meter 85 is provided. The temperature meter 85 comprises a movable coil 86 connected to a thermocouple 87, a pointer 88 mounted to the movable coil 86 and moved thereby over a temperature scale 89. The movable coil 86 is biased to the zero end of the scale by the coil spring 90. The movable coil 86 is mounted between the poles of the permanent magnet 91. An arm 92 is pivotally mounted in cooperation with the meter 85 about the same pivot axis as the movable coil 86. The arm 92 is manually movable to index the arm 92 at any temperature on the scale 89. The arm 92 carries a suitable source of radiant energy 93 and a bead-type thermistor 95. The source of radiant energy 93 and the thermistor 95 are mounted in a spaced apart relationship to each other radially of the pivot axis of the arm 92, and a focusing mirror 94 is positioned to focus the radiant energy from the source of radiant energy 93 onto the thermistor 95. The temperature indicator or pointer 88 carries an opaque vane 96 at a position thereon such that when the pointer 88 indicates the same temperature on the scale 89 as that to which the arm 92 has been indexed, the vane 96 will be interposed between the source of radiant energy 93 and the thermistor 95 to block the beam of radiant energy from the source of radiant energy 93.

The fluid tank 97 comprises a fluid inlet pipe 98 and a fluid outlet pipe 99. The fluid tank 97 is also provided with an opening 100 therein into which the thermocouple 87 of the temperature meter 85 may be inserted. The opening 100 into the fluid tank 97 serves to efficiently permit the fluid within the tank 97 to heat or cool the thermocouple 87 to the temperature of the fluid therein. Thus it may be seen that the pointer 88 will at all times indicate upon the temperature scale 89 the temperature of the fluid within the tank 97. To heat the fluid within the tank 97, a gas burner element 75 is provided and mounted in cooperation with the tank 97. Gas is supplied to the burner element 75 from a source of gas 76 and a solenoid valve 77 mounted between the source of gas 76 and the burner element 75. The solenoid valve 77 is electrically operated to control the amount of gas delivered to the burner element 75. These elements of the tank 97, the burner element 75, the source of gas 76, and the solenoid valve 77 may be of any suitable type known in the art. A source of power 78 is also provided. One side of the source of power 78 is connected to a single-pole single-throw switch 79. The other side of the switch 79 is connected to one side of the source of radiant energy 93 and to one side of the solenoid valve 77. The other side of the source of power 78 is connected to the other side of the source of radiant energy 93 and to one contact of the pair of contacts 80 of relay 81. The other contact of the pair of contacts 80 is connected to the other side of the solenoid valve 77. The contacts 80 of relay 81 are so arranged that contacts 80 are closed when relay 81 is energized and opened when relay 81 is deenergized. Thus it may be seen that when switch 79 is closed, an obvious circuit for the energization of the source of radiant energy 93 is completed, and an obvious circuit for the operation of solenoid valve 77 is partially completed. The circuit for the operation of solenoid valve 77 is completed by the closing of contacts 80 of relay 81. The relay coil of relay 81 is connected in series with a battery 82, thermistor 95, and a single-pole single-throw switch 83.

To describe the operation of the embodiment of the present invention shown in Figure 9, reference is made thereto. Assuming that the temperature of the fluid in the tank 97 is below that to which the arm 92 has been indexed on the scale 89, and that switches 79 and 83 are closed, the source of radiant energy 83 and the focusing mirror 94 will direct radiant energy to the thermistor 95. As the thermistor 95 is heated, its resistance will drop and when a predetermined value is reached, the relay 81 will be energized over the described series circuit. Relay 81 will operate to close contacts 80. The closing of contacts 80 completes the circuit for the operation of solenoid valve 77. Solenoid valve 77 will operate to permit gas from the source of gas 76 to flow to the burner element 75. The burning gas at the burner element 75 will heat the fluid in the tank 72. As the temperature of the fluid within the tank 97 rises, the thermocouple 87 will produce a current through the movable coil 86 proportional to the water temperature. The magnetic field set up by the movable coil 86 in cooperation with the magnetic field of the permanent magnet 91 will cause the pointer 88 to be moved upwardly on the scale 89 against the bias of the spring 90. When the pointer 88 reaches the temperature to which the arm 92 has been indexed on the scale 89, the vane 96 will be interposed between the source of radiant energy 93 and the thermistor 95. The thermistor 95 will then cool, and its resistance will increase. When the resistance of the thermistor 95 reaches a certain predetermined value, the relay 81 will restore opening its contacts 80. The opening of contacts 80 will break the circuit for the operation of the solenoid valve 77, and the solenoid valve 77 will restore shutting off the gas flow from the source of gas 76 to the burner element 75. As the fluid within the tank 97 is cooled or as the heated fluid therein is replaced by cooler fluid entering the inlet pipe 98, the meter 85 will register that cooler temperature of the fluid by a movement of the pointer 88 downward on the scale 89. When the vane 96 carried by the pointer 88 is no longer positioned between the source of radiant energy 93 and the thermistor 95, the source of radiant energy 93 will again heat the thermistor 95 to lower its resistance, and the relay 81 will again operate as previously described. Thus it may be seen that the fluid in the tank 97 will be maintained substantially at the temperature to which the arm 92 has been indexed. It should be noted that the anticipator element previously described may also be applied to this embodiment to effectively reduce the various inertias.

Having described the invention, what is considered new and desired to be protected by Letters Patent is:

1. In an electric control system for controlling the temperature of a body heated by an electrically operated heating element, a source of radiant energy, a thermistor having a high temperature coefficient of resistance mounted in cooperation with said source of radiant energy so that said source of radiant energy directly heats said thermistor to lower the resistance of said thermistor to a certain value, a temperature meter mountable in cooperation with said body for indicating the temperature of said body, said temperature meter including a pointer and a scale for indicating the temperature of said body upon said scale, means movably carrying said source of radiant energy and said thermistor in said meter in cooperation with said scale so that said source of radiant energy and said thermistor are selectively positionable at different temperature readings on said scale, means carried by said pointer and cooperating with said source of radiant energy and said thermistor for interrupting the emission of radiant energy from said source of radiant energy to said thermistor when said pointer indicates the temperature reading on said scale at which said source of radiant energy and said thermistor are selectively positioned to permit the resistance of said thermistor to rise to another certain value, and means connected to said thermistor and associated with said heating element for energizing said heating element responsive to the lowering of the resistance of said thermistor to said certain value and for deenergizing said heating element responsive to the raising of the resistance of said thermistor to said another certain value, said last mentioned means having a voltage-current characteristic so that the resistance of said thermistor varies directly as the resistance for the portion of the voltage-current curve of said thermistor wherein the current substantially greatly changes for relatively small changes in voltage.

2. In an electrical control system for controlling the temperature of a body heated by an electrically controlled heating element, a source of radiant energy, a thermistor having a high temperature coefficient of resistance mounted in cooperation with said source of radiant energy so that said source of radiant energy directly heats said thermistor to change the resistance of said thermistor to a certain value, a temperature meter mountable in cooperation with said body for indicating the temperature of said body, said temperature meter including a pointer and a scale for indicating the temperature of said body upon said scale, means movably carrying said source of radiant energy and said thermistor in said meter in cooperation with said scale so that said source of radiant energy and said thermistor are selectively positionable at different temperature readings on said scale, means carried by said pointer and cooperating with said source of radiant energy and said thermistor for interrupting the emission of radiant energy from said source of radiant energy to said thermistor when said pointer indicates the temperature reading on said scale at which said source of radiant energy and said thermistor are selectively positioned to permit said thermistor to cool to change the resistance of said thermistor to another certain value, and means connected to said thermistor and associated with said electrically controlled heating element for said body for energizing said heating element responsive to the changing of the resistance of said thermistor to said one certain value and for deenergizing said heating element responsive to the changing of the resistance of said thermistor to said another certain value, said last mentioned means having a voltage-current characteristic so that the resistance of said thermistor varies directly as the resistance for the portion of the voltage-current curve of said thermistor wherein the current substantially greatly changes for relatively small changes in voltage.

3. In an electrical control system for controlling the temperature of a body heated by an electrically controlled heating means, a source of radiant energy, a thermistor having a high temperature coefficient of resistance mounted in cooperation with said source of radiant energy so that said source of radiant energy directly heats said thermistor to vary the resistance of said thermistor, a temperature scale, means movably carrying said source of radiant energy and said thermistor in cooperation with said scale to select different temperatures on said scale, means connected to said thermistor and associated with said electrically controlled heating device for controlling the operation of said heating device responsive to different resistances of said thermistor, said last mentioned means having a voltage-current characteristic so that the resistance of said thermistor varies directly as the resistance for the portion of the voltage-current curve of said thermistor wherein the current substantially greatly changes for relatively small changes in voltage, and means operating responsive to the temperature of said body corresponding to any selected temperature of said source of radiant energy and said thermistor on said scale for controlling the emission of radiant energy from said source of radiant energy to said thermistor.

4. In an electric control system for an electrically controlled heating system, a source of radiant energy, a thermistor having a high temperature coefficient of resistance mounted in cooperation with said source of radiant energy so that said source of radiant energy directly heats said thermistor to vary the resistance of said thermistor, a temperature scale, means movably carrying said source of radiant energy and said thermistor in cooperation with said scale so that said source of radiant energy and said thermistor are movable to different selected temperatures on said scale, a series circuit including a relay coil, a power source and said thermistor, relay contacts associated with said relay coil so that said relay contacts are operated by said relay coil, said relay coil, said power source and said thermistor being formed to have certain relative values so that said relay contacts are operated responsive to different resistances of said thermistor, said series circuit having a voltage-current characteristic so that the resistance of said thermistor varies directly as the resistance for the portion of the voltage-current curve of said thermistor wherein the current substantially greatly changes for relatively small changes in voltage, circuit means connected to said relay contacts and associated with said electrically controlled heating system so that said electrically controlled heating system is operated responsive to the operation of said relay contacts, and means operating responsive to the temperature of said electrically controlled heating system for controlling the emission of radiant energy from said source of radiant energy to said thermistor at temperatures of said electrically controlled heating system corresponding to the selected temperature of said source of radiant energy and said thermistor on said scale.

5. In an electric control system as claimed in claim 4, wherein said last-mentioned means includes a movable opaque vane, said movable opaque vane movable to block the emission of radiant energy from said source of radiant energy to said thermistor at the temperature of said electrically controlled heating system corresponding to said selected temperature of said source of radiant energy and said thermistor on said scale.

6. In an electric furnace control system, a source of radiant energy, a thermistor having a high temperature coefficient of resistance mounted in cooperation with said source of radiant energy so that said source of radiant energy directly heats said thermistor to vary the resistance of said thermistor, means connected to said thermistor and associated with said electric furnace for connecting and disconnecting power to said electric furnace responsive to certain resistance values of said thermistor, said last mentioned means having a voltage-current characteristic so that the resistance of said thermistor varies directly as the resistance for the portion of the voltage-current curve of said thermistor wherein the current substantially greatly changes for relatively small changes in voltage, a furnace temperature meter associated with said electric furnace and operating responsive to the temperature within said electric furnace for indicating the temperature thereof through a movable pointer cooperating with a temperature scale, means movably carrying said source of radiant energy and said thermistor in said meter in cooperation with said scale so that said source of radiant energy and said thermistor are selectively positionable at different temperature readings on said scale, and an opaque vane carried by said pointer and cooperating with said source of radiant energy and said thermistor for interrupting the passage of any rays of radiant energy from said source of radiant energy to said thermistor at temperatures within said electric furnace corresponding to the temperature reading positions of said source of radiant energy and said thermistor on said scale and for permitting the passage of any rays of radiant energy from said source of radiant energy to said thermistor at temperatures within said electric furnace corresponding to temperature reading positions on said scale other than temperature reading positions of said source of radiant energy and said thermistor.

7. In an electric furnace control system, a thermistor having the properties of a relatively high resistance at normal temperatures and a relatively low resistance when heated to a certain degree, a source of heat mounted in a spaced apart relationship to said thermistor for heating said thermistor to said certain degree, a temperature scale, means movably carrying said source of heat and said thermistor in cooperation with said scale so that said source of heat and said thermistor are movable to different selected temperatures on said scale, a series circuit comprising said thermistor, a power source and a relay, said relay formed to operate responsive to said relatively low resistance and to release responsive to said relatively high resistance, said series circuit having a voltage-current characteristic so that the resistance of said thermistor varies directly as the resistance for the portion of the voltage-current curve of said thermistor wherein the current substantially greatly changes for relatively small changes in voltage, circuit means including the relay contacts of said relay and connectable to said electric furnace and a power source for energizing said furnace responsive to the operation of said relay and for deenergizing said furnace responsive to the release of said relay, and means operating responsive to temperatures of said furnace corresponding to other than any selected temperature of said source of heat and said thermistor on said scale to permit said source of heat to heat said thermistor to said certain degree and operating responsive to a temperature of said furnace corresponding to any selected temperature of said source of heat and said thermistor on said scale to interrupt the path of heat from said source of heat to said thermistor to permit said thermistor to cool to normal temperatures.

8. In an electric furnace control system as claimed in claim 7, a resistor in said series circuit, means associated with said electric furnace for shunting said resistor when said thermistor is being heated.

9. In an electric furnace control system as claimed in claim 7, anticipator means associated with said electric furnace and said power source for energizing said furnace and operating responsive to the energization and deenergization of said furnace for reducing the resistance in said series circuit when said thermistor is heated and for increasing the resistance in said series circuit when said thermistor is cooling.

10. In an electric furnace control system, a thermistor having the properties of a relatively high resistance at normal temperatures and a relatively low resistance when heated to a certain degree, a source of heat mounted in a spaced apart relationship to said thermistor for heating said thermistor to said certain degree, means connected to said thermistor and associated with said electric furnace for energizing said electric furnace responsive to said low resistance and for deenergizing said electric furnace responsive to said high resistance, said last mentioned means having a voltage-current characteristic so that the resistance of said thermistor varies directly as the resistance for the portion of the voltage-current curve of said thermistor wherein the current substantially greatly changes for relatively small changes in voltage, and a temperature meter associated with said electric furnace and operating responsive to the temperature of said electric furnace for indicating the temperature thereof by a movable pointer cooperating with a temperature scale, means movably carrying said source of heat and said thermistor in cooperation with said temperature scale so that said source of heat and said thermistor are movable to different selected temperatures on said scale, and a vane carried by said pointer and cooperating with said source of heat and said thermistor so that at temperatures of said furnace corresponding to temperatures other than any selected temperatures of said source of heat and said thermistor on said scale said source of heat is permitted to heat said thermistor to said certain degree and at a temperature of said furnace corresponding to any selected temperature of said source of heat and said thermistor on said scale said vane interrupts the path of heat from said source of heat to said thermistor to permit said thermistor to cool to normal temperatures.

11. In an electric control system for controlling a heating system, a thermistor having the properties of a relatively high resistance at one temperature and a relatively low resistance at another temperature, a source of heat mounted in a spaced apart relationship to said thermistor for directly heating said thermistor, means connected to said thermistor and associated with said heating system for energizing said heating system responsive to said low resistance and for deenergizing said heating system responsive to said high resistance, said last mentioned means having a voltage-current characteristic so that the resistance of said thermistor varies directly as the resistance for the portion of the voltage-current curve of said thermistor wherein the current substantially greatly changes for relatively small changes in voltage, and a temperature meter associated with said heating system and operating responsive to the temperature produced thereby for indicating the temperature thereof by a movable pointer cooperating with a temperature scale, means movably carrying said source of heat and said thermistor in cooperation with said temperature scale whereby said source of heat and said thermistor are movable to different selected temperatures on said scale, and a vane carried by said pointer and cooperating with said source of heat and said thermistor so that at temperatures produced by said heating system corresponding to any temperatures other than any selected temperature of said source of heat and said thermistor on said scale said source of heat is permitted to heat said thermistor to one temperature and at a temperature produced by said heating system corresponding to any selected temperature of said source of heat and said thermistor on said scale said vane interrupts the path of heat from said source of heat to said thermistor to permit said thermistor to cool.

12. In an electric furnace control system, a thermistor having the properties of a relatively high resistance at normal temperatures and a relatively low resistance when heated to a certain degree, a source of heat mounted in a spaced apart relationship to said thermistor for heating said thermistor to said certain degree, a series circuit comprising said thermistor, a power source and a relay, said relay formed to operate responsive to said relatively low resistance and to release responsive to said relatively high resistance, said series circuit having a voltage-current characteristic so that the resistance of said thermistor varies directly as the resistance for the portion of the voltage-current curve of said thermistor wherein the current substantially greatly changes for relatively small changes in voltage, circuit means including the relay contacts of said relay and connectable to said electric furnace and a power source for energizing said furnace responsive to the operation of said relay and for deenergizing said furnace responsive to the release of said relay, and a temperature meter associated with said electric furnace and operating responsive to the temperature of said electric furnace for indicating the temperature thereof by a movable pointer cooperating with a temperature scale means movably carrying said source of heat and said thermistor in cooperation with said temperature scale so that said source of heat and said thermistor are movable to different selected temperatures on said scale, and a vane carried by said pointer and cooperating with said source of heat and said thermistor so that at any temperatures of said furnace corresponding to temperatures below any selected temperature of said source of heat and said thermistor on said scale, said source of heat is permitted to heat said thermistor to said certain degree and at a temperature of said furnace corresponding to any selected temperature of said source of heat and said thermistor on said scale, said vane interrupts the path of heat from said source of heat to said thermistor to permit said thermistor to cool to normal temperatures.

13. In combination, a temperature meter comprising a movable pointer operating to indicate on a temperature scale temperatures measured by said meter, a vane carried by said pointer, and circuit means including a pair of contacts, said circuit means operating to close said contacts when said pointer indicates a temperature in a certain temperature range on said scale below a certain selected temperature and operating to open said contacts when said pointer indicates said selected temperature at the upper end of said certain temperature range, said circuit means comprising a thermistor having a high temperature coefficient of resistance and a source of radiant energy for heating said thermistor to lower the resistance thereof, said circuit means operating responsive to the lowered resistance of said thermistor for closing said contacts, said thermistor and said source of radiant energy movably mounted in a spaced apart relationship in said meter so that said source of radiant energy and said thermistor are selectively movable to positions corresponding to said certain selected temperature on said scale so that said vane is positioned between said thermistor and said source of radiant energy when said pointer indicates said certain selected temperature at the upper end of said range whereby the resistance of said thermistor rises, said circuit means operating responsive to the temperature rise of said thermistor to open said contacts, said circuit means having a voltage-current characteristic so that the resistance of said thermistor varies directly as the resistance for the portion of the voltage-current curve of said thermistor wherein the current substantially greatly changes for relatively small changes in voltage.

14. In combination, a temperature meter comprising a movable pointer operating to indicate on a temperature scale temperatures measured by said meter, a vane carried by said pointer, a thermistor having the properties of a relatively high resistance at normal temperatures and a relatively low resistance when heated to a certain degree, a source of heat mounted in a spaced apart relationship to said thermistor for heating said thermistor to said certain degree, said thermistor and said source of heat movably mounted in said meter so that said source of heat and said thermistor are selectively movable to positions corresponding to certain selected temperatures on said scale, said source of heat and said thermistor being mounted in cooperation with said pointer so that when the temperature corresponding to any of said certain selected temperatures is indicated by said pointer on said scale said vane is positioned between said thermistor and said source of heat whereby said thermistor is permitted to cool to normal temperatures, and circuit means including a pair of contacts, said circuit means cooperating with said thermistor and operating responsive to said relatively low resistance of said thermistor to close said contacts and operating responsive to said relatively high resistance of said thermistor to open said contacts, said circuit means having a voltage-current characteristic so that the resistance of said thermistor varies directly as the resistance for the portion of the voltage-current curve of said thermistor wherein the current substantially greatly changes for relatively small changes in voltage.

15. In combination, a temperature meter comprising a movable pointer operating to indicate on a temperature scale temperatures measured by said meter, a vane carried by said pointer, a thermistor having the properties of a relatively high resistance at normal temperatures and a relatively low resistance when heated to a certain degree, a source of heat mounted in a spaced apart relationship to said thermistor for heating said thermistor to said certain degree, said thermistor and said source of heat mounted in said meter so that when a certain temperature is indicated by said pointer on said scale said vane is positioned between said thermistor and said source of heat whereby said thermistor is permitted to cool to normal temperatures, and a series circuit comprising said thermistor, a power source and a relay, said relay formed to operate to close the contacts thereof responsive to said relatively low resistance and to release to open the contacts thereof responsive to said relatively high resistance, said series circuit having a voltage-current characteristic so that the resistance of said thermistor varies directly as the resistance for the portion of the voltage-current curve of said thermistor wherein the current substantially greatly changes for relatively small changes in voltage, said source of heat and said thermistor being mounted in a spaced apart relationship upon an arm, said arm pivotally mounted in said meter to pivot about the same axis of pivoting as said pointer and in a plane through which said vane is carried, and means on said arm cooperating with said temperature scale for indicating the pivotal position of said arm relative to said temperature scale.

References Cited in the file of this patent

UNITED STATES PATENTS

| Number | Name | Date |
|---|---|---|
| 1,455,795 | Logan | May 22, 1923 |
| 1,776,901 | Essex | Sept. 30, 1930 |
| 1,810,172 | Hayes | June 16, 1931 |
| 2,160,823 | Black | June 6, 1939 |
| 2,161,950 | Christensen | June 13, 1939 |
| 2,218,464 | Fairchild | Oct. 15, 1940 |
| 2,264,256 | Fairchild | Nov. 25, 1941 |
| 2,810,526 | Rogers | Oct. 22, 1957 |

OTHER REFERENCES

"Thermistors, Their Characteristic and Uses," pp. 106–111, Bell Laboratories Record.